March 21, 1939.  S. ALVINE  2,151,177
TABULATOR DRIVE CONTROL
Filed Oct. 22, 1937   3 Sheets-Sheet 1

INVENTOR
SAMUEL ALVINE
BY W. Q. Sparks
ATTORNEY

March 21, 1939.  S. ALVINE  2,151,177

TABULATOR DRIVE CONTROL

Filed Oct. 22, 1937  3 Sheets-Sheet 2

INVENTOR
SAMUEL ALVINE
BY W. A. Sparks
ATTORNEY

March 21, 1939. S. ALVINE 2,151,177
TABULATOR DRIVE CONTROL
Filed Oct. 22, 1937 3 Sheets-Sheet 3
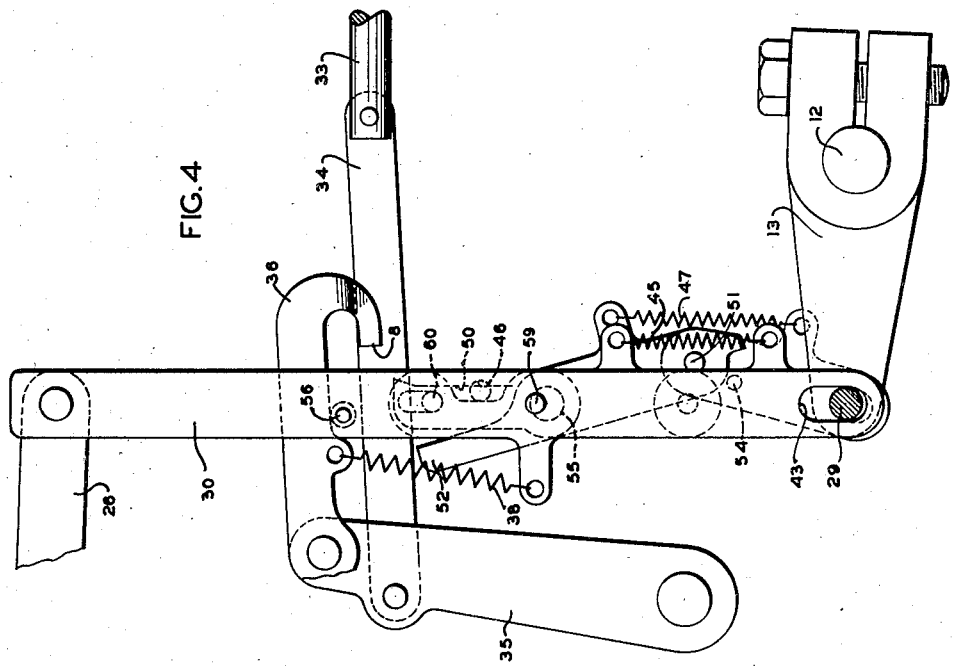
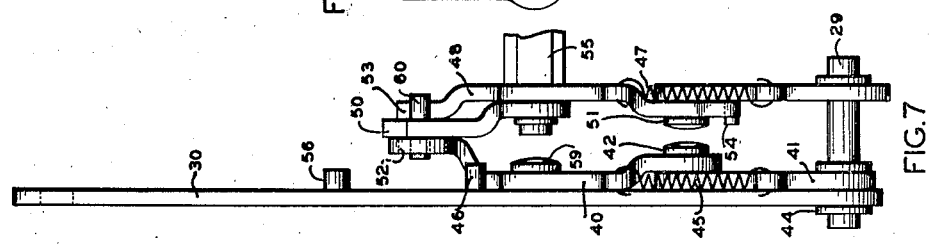
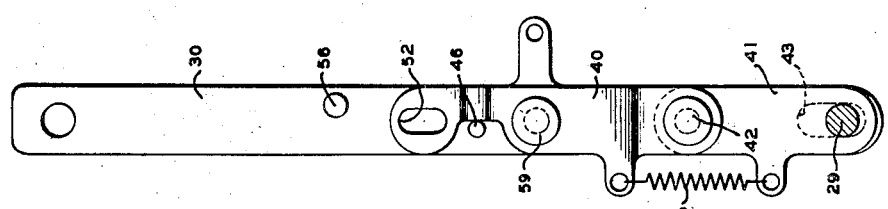
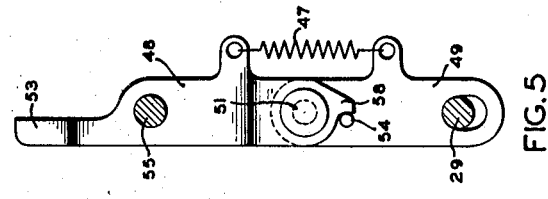
INVENTOR
SAMUEL ALVINE
BY *W. A. Sparks*
ATTORNEY Patented Mar. 21, 1939

2,151,177

UNITED STATES PATENT OFFICE 2,151,177

TABULATOR DRIVE CONTROL

Samuel Alvine, Newark, N. J., assignor to Remington Rand Inc., Buffalo, N. Y., a corporation of Delaware Application October 22, 1937, Serial No. 170,351

4 Claims. (Cl. 271—56)

This invention relates to punched card tabulating machinery and particularly to the start-stop mechanism thereof as controlled by automatic total taking. A machine to which the present invention is adaptable is disclosed in the U. S. Patent to W. W. Lasker, No. 2,044,119, issued June 16, 1936, and in an application of W. W. Lasker, Serial Number 156,692, filed July 31, 1937.

As is fully described in the above patent and application total taking operations are initiated by a change of designation, i. e., a change in the data of particular fields of a card. Separate and distinct fields of the card are used for controlling the taking of totals and grand totals. If this data remains unchanged the machine accumulates the items from the cards until a change does occur at which time the card is held in the card chamber and the card feed is disabled until the machine has made three cycles for a total or four for a grand total. When the total has been taken the card is resensed and then fed out and a new series started.

It is obvious however that eventually a condition will arise wherein all of the cards are exhausted from the card magazine and the last card is fed to the sensing chamber. When this card leaves the magazine, mechanism which will be described later, automatically stops the machine at the end of the cycle. The card is thus left in the sensing chamber and as a general rule this card is the end of a series and therefore will not initiate a total taking operation. This condition may be overcome by inserting two blank cards in the stack directly after the last item card. One card being used to initiate a total or grand total operation and the other to insure the feeding of the first blank card into the sensing chamber. The first card due to the fact that there is no data punched therein which amounts to a change of designation, will initiate a total or grand total operation depending upon the type of total the mechanism is set for. The use of the blank cards however is a nuisance and therefore a great many operators use the starting button to cause the machine to pass through three or four cycles to obtain a total or grand total and get the last card out of the machine. This results in excess wear on the clutch mechanism.

With the present invention the machine operator instead of having to press the button a plurality of times with the consequent operation and release of the clutch mechanism each time, will merely have to press the button once and hold it until the necessary number of cycles are effected whereupon the button is released and the machine will stop.

Broadly speaking this invention includes a lever operable by the starting button of a tabulator, which lever is resiliently connected to the automatic stopping mechanism of said tabulator and is adapted to render said automatic stopping mechanism ineffective as long as said starting button is actuated.

One object of the present invention is to provide means for rendering the automatic stopping mechanism of a tabulator ineffective as desired.

Another object of the present invention is to provide means adapted, under control of the start-stop button of a tabulator to enable the initiation of a complete total taking operation by one actuation of said button instead of the customary three or more actuations.

Other objects and structural details of the present invention will be apparent from the following description when read in connection with the accompanying drawings, wherein:

Fig. 4 is a fragmentary elevational view illustrating the clutch tripping toggle mechanism in running position.

Fig. 5 is an elevational view of the inner toggle.

Fig. 6 is an elevational view of the outer toggle and its relation to the operating link.

Fig. 7 is an end view of the toggle mechanism taken from the front of the machine.

Fig. 8 is an elevational view of the toggle breaking lever.

Fig. 9 is an isometric view of the stop pin engaged by record cards in the magazine.

Figure 1:
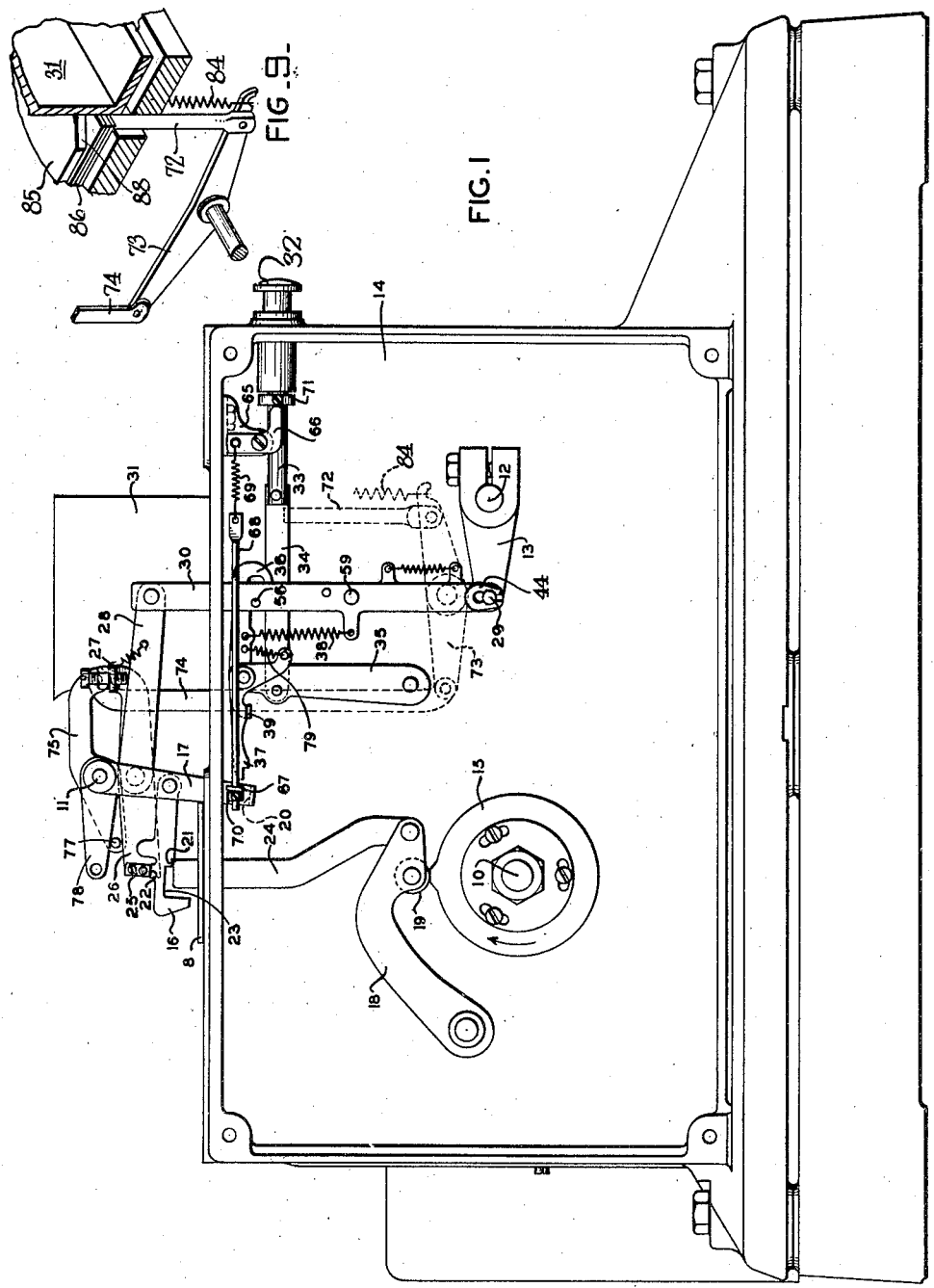
Fig. 1 is a fragmentary view of the left side of a tabulator base and illustrates the mechanism after the machine has automatically stopped for lack of cards in the supply magazine.
Figure 2:
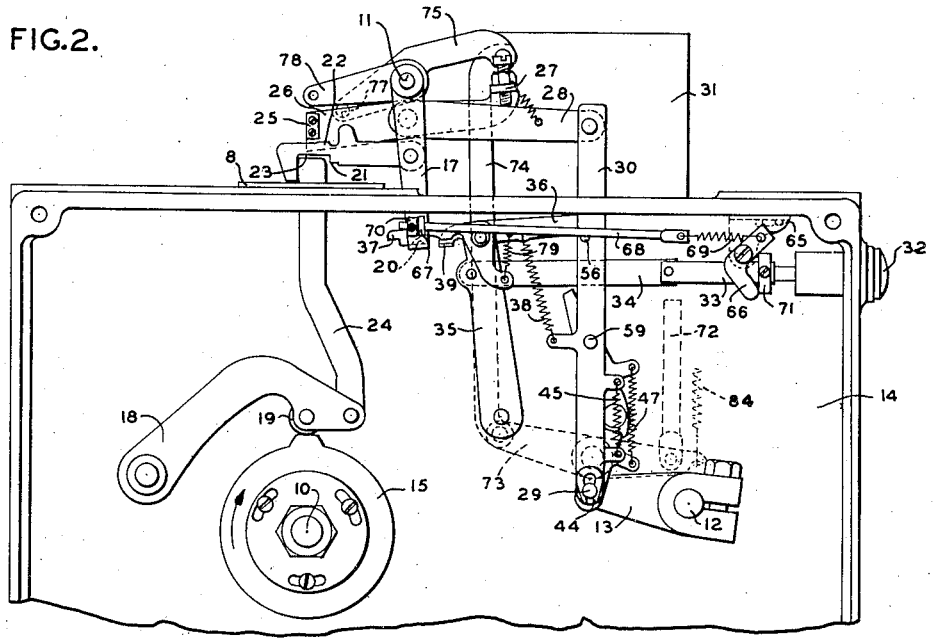
Fig. 2 is a view similar to Fig. 1 and illustrates the control button in its effective position whereat the automatic stop mechanism is held ineffective.

The stopping and starting mechanism for a tabulator of the type disclosed in the above mentioned patent is old and is not claimed herein but will be described in order to clarify the basic structure upon which the present invention is built. As will be seen from Figs. 1, 2 and 4, a clutch engaging and disengaging arm 13, which is the same as the arm 45 in Fig. 5 of the above mentioned Lasker patent, is mounted fast upon the left-hand end of a shaft 12 which runs from side-to-side across the front of the machine and acts to engage or disengage the old and well-known machine clutch which is not shown in the present application but which is clearly shown in Fig. 6 of the above patent. The clutch arm 13 is shown in detail with its associated operating toggles in Fig. 4 of the present drawings. In Figs. 1 and 2, a cam 15, mounted upon the left-hand end of the main shaft 10 of the machine, normally lies in the position shown and is formed with a single short rise, which is adapted to contact a follower roller 19, mounted upon the right hand side of an arm 18 which is pivotally mounted on the casing 14. The arm 18 pivotally supports at its forward end, a vertical push-rod 24 which extends through a slot in a guide plate 8 fixed to the top of the frame casting 14, and is guided, by the slot, for vertical movement. An interponent arm 16 is pivoted to the middle portion of a lever 17, which extends downwardly from its pivot point 11 and carries, at its bottom, a right angle lug 20. The interponent 16 is formed with a shoulder 22, on its upper edge and a recess 23 formed with a step portion 21, in its lower edge and the push-rod 24, being in the same vertical plane as the interponent 16 is adapted under certain conditions to engage the interponent and elevate it.

The guide plate 8 provides a bearing on which the downwardly extending projection of interponent 16 is free to slide, when moved by the lever 17, after having been released by the push-rod 24. Just above the interponent 16 is a lever 26 which has secured to its rear end, a block 25 which is adapted to be acted upon by the shoulder 22 on the interponent when it is desired to stop the machine. The lever 26 carries, at its forward end, a right angle lug 27, which overlies a lever 28 and which carries an adjusting screw as is old and well known. Both levers 26 and 28 are resiliently connected and are pivoted upon a rock shaft which is suitably supported by a casting (not shown) secured to the top of the frame casting 14. The forward end of the lever 28 is pivoted to the top of an upright link 30, the lower end of which is pivotally secured by a short shaft 29 to the clutch arm 13. Thus, it will be seen that, if the interponent 16 is moved toward the rear of the machine and held there until the rise, on the cam 15, rocks the follower 18, the push-rod 24 will engage the step 21 on interponent 16 and the shoulder 22 thereof will contact the block 25 and swing the lever 26 clockwise (as seen in Fig. 1) which, in turn, will swing the lever 28 in the same direction and force the link 30 downward to disengage the clutch.

The means for causing the interponent 16 to assume its effective position, i. e., with the step 21 aligned with push rod 24 includes a push button 32 which is normally pressed toward the front of the machine by a coiled spring (not shown) and which has a rearwardly extending stem 33. As will be seen from Figs. 1, 2, and 4, the rear end of the stem 33 is pivotally connected to the forward end of a link 34 which is in turn pivoted at its rear end to a rock lever 35 which is pivotally mounted on the casing 14. Pivoted to the upper end of the rock lever 35, are two adjacent levers 36 and 37. The forwardly extending lever 36 is formed with a hook at its forward end and is tensioned clockwise (Fig. 4) by a spring 38 which is anchored at its upper end to the lever 36 and at its lower end to a lug on the link 30. At its rear end, the lever 36 is formed with a leftwardly bent lug 39 which underlies the bell-crank 37 and limits its counter-clockwise move about their common pivot. A spring 79 anchored at its upper end to the lever 36 and at its lower end to the bell-crank 37, tends to constantly keep the bell-crank against the lug 39. The rear end of the bell-crank 37 is formed, as shown, with a notch for engagement with the lug 20 of the arm 17 and it will be seen that the spring 38 tends to rock both levers 36 and 37 clockwise, as shown in Fig. 2, so that the notch will clear the lug 20 when the machine is being started. When, however, the machine is operating, the levers 36 and 37 will be rocked counter-clockwise to a position in which the notch will be in a position to contact the lug 20 and move the interponent 16 toward the rear to stop the machine, as will now be explained.

Adjacent the right-hand or inner side of the link 30 are two toggles as will be clearly seen in Figs. 4, 5, 6, and 7. The outer toggle, which lies flush with the right-hand side of the link 30, consists of two short links 40 and 41 which are pivoted together at 42. The upper link 40 of the outer toggle is pivoted at 59 to the link 30. The lower link 41 of the outer toggle is pivoted on a short shaft 29 one end of which extends through a slot 43 in the link 30 and is held against lateral movement by a keeper 44. A spring 45 tends constantly to keep the toggle in its straightened position, in which position it limits against a pin 46 in the link 30 as shown in Fig. 6. The top end of the upper toggle link 40 is formed with a slot 52 which embraces a pin 60 (Fig. 7) which pin extends through the toggle breaking lever 50. The inner toggle is somewhat similar to the outer toggle. The upper link 48 thereof (see Fig. 5) is formed with an offset finger 53 and is pivoted to a lower link 49 by a pin 51. A spring 47, similar to the spring 45, tends constantly to hold the inner toggle in its straightened position wherein a nose 58, on the upper link 48, limits against a pin 54 secured in the left-hand face of the lower link 49. The upper link 48 is pivoted on a stud 55 which is suitably secured in the left frame plate 14 of the machine. The toggle breaking lever 50, as will be seen from Fig. 7, lies directly between the outer and inner toggles and is pivoted upon the frame stud 55 and it will also be seen that, if the lever 50 is swung counter-clockwise, as seen in Fig. 4 the pin 60 will act to break both toggles. Fig. 1 shows the normal or unoperated position of the toggle assembly, while Fig. 4 shows the toggles in the position they assume when the machine is operating. When the machine is running and the clutch is engaged, the clutch spring (not shown herein but designated by the reference numeral 34 in Fig. 6 of the drawings of the Patent 2,044,119) holds the inner toggle broken as is shown in Fig. 4. The outer toggle is straight and, since this is so, the link 30 is in its uppermost position with the lower end of its slot 43 occupied by the short shaft 29. Since the link 30 is in its upper position a pin 56, fast on its right-hand side, engages the underside of the hooked lever 36 and holds it in such a position that, if the stopping and starting button 32 were pushed in, the hook on the lever 36 would not engage the nose of the toggle breaking lever 50 or affect either toggle. However, the rearward movement of the lever 36 would (Fig. 1) move the notch in lever 37, against the lug 20 of arm 17 and move the arm a short distance rearwardly. This would move the shoulder 22 of the interponent 16, under the lug 25 on the lever 26 and would position the step 21 so that when the cam 15 next lifted the rod 24, the levers 26 and 28 would be rocked in a clockwise direction to push down the link 30. At this time the outer toggle is straight and the shaft 29 is still in the lower end of the slot 43 in link 30, and, consequently, when the link is pushed down, the straightened outer toggle is also forced down thus pushing down the shaft 29 which rocks lever 13 and disengages the clutch (not shown) and allows the spring 47 (Fig. 4) to straighten the inner toggle. This toggle will now hold the clutch disengaged until the starter button 32 is again pushed in. Since the link 30 is now in its lower position, the pin 56, thereon, will allow the hooked lever 36 to assume its normal position. In its normal position the lever 36 is so located that, if the starter button 32 were pushed in, its hooked portion would contact the nose of the toggle breaking lever 50 and break both toggles. In its normal position the lever 36 would also be holding the spring pressed lever 37 in such a position that the notch, thereon, would clear the lug 20 on lever 17 as is shown in Fig. 2. When both toggles are broken, as is the case when the machine is being started, the clutch spring overcomes the tension of the spring 47 and the inner toggle remains broken as shown in Fig. 4. However, the outer toggle remains broken only for an instant. The action of its spring 45 immediately restores it to its normal position shown in Fig. 4.

In summation, when the machine is in normal unoperating position, both toggles must be broken to start it and the inner toggle then remains broken but the outer toggle immediately snaps to normal, unbroken, position raising the link 30 and the interponent 16 drops into contact with the limit plate 8. To stop the machine, the button 32 is pushed in again, and though the toggles are unaffected by this action, the interponent 16 is moved to its active position, i. e., with step 21 aligned with the push rod 24. When the cam 15 next raises the push rod 24, the levers 26 and 28 act to push down link 30, thus straightening the inner toggle, and thereby rocking arm 13 to disengage the clutch.

Figure 10:
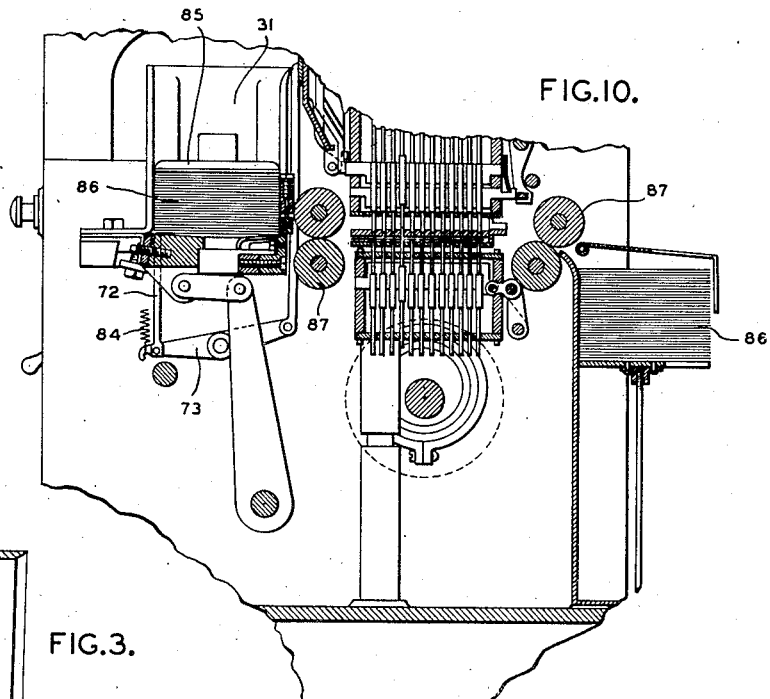
Fig. 10 is a vertical section of the base of the tabulator showing some parts in side elevation.

Looking at Figs. 2, 9 and 10 let it be assumed that supply magazine 31 contains a stack of cards. This stack of cards will bear upon the upwardly extending spring held pin 72 which is connected through arm 73, link 74, to lever 75 which is pivoted on shaft 11. The lever 75 carries a pin 77 which cooperates with a lever 78 fixed to shaft 11 upon which is also fixedly mounted lever 17. A flat plate 85 of iron or other heavy material is placed on top of the card stack 86. As the cards are picked from the bottom of the stack and fed through rollers 87, the weight of the plate 85 will keep the pin 72 depressed.

As may be readily seen in this view the weight of the cards on pin 72 will rock lever 73 clockwise elevating link 74 and rocking lever 75 counter-clockwise which will release lever 78 permitting lever 17 to rotate counter-clockwise through its own weight to the position shown in Fig. 2. The rocking of lever 17 will draw interponent 16 to the right into a position in which any elevation of rod 24 will be ineffective due to the step 21 being drawn out of alignment therewith.

As set forth above, when button 32 is actuated and hook member 36 travels rearwardly, latch member 37 will also be shifted and will override the turned over lower portion 20 of lever 17 on which interponent member 16 is mounted. Consequently with latch member 37 in this position when pin 56 fixed in link 30 is raised, only hook member 36 will be rocked to its full extremity. However, when push button 32 is released spring 79 will cause latch member 37 to snap into an effective position and on a second actuation of button 32, while the machine is running, said latch member will engage the lug 20 on lever 17 thus shifting interponent 16 rearwardly to a point whereat stop portion 21 overlies rod 24 and shoulder 22 thereof underlies lug 25 of lever 26. With interponent 16 in the position just described it may readily be seen that the next time the high point of cam 15 engages roller 19, rod 24 will be raised thus causing lever 26 to be positively rocked clockwise thereby forcing link 30 and the outer toggle which is connected thereto by rivet 59, downwardly consequently causing shaft 12 to be rocked counter-clockwise thereby disengaging the driving clutch (not shown). When link 30 through the outer toggle forces pin 29 of arm 13 downwardly, spring 47 of the inner toggle will cause said toggle to be straightened and thereby lock the clutch in its disengaged position (Fig. 1).

As set forth in the above cited patent when the supply of cards in magazine 31 becomes exhausted pin 72 will be moved upwardly, passing by the cut off portion 88 of the plate 85 through the action of spring 84 to actuate arm 73, link 74, levers 75 and 78, shaft 11, lever 17, and interponent 16 to cause the disengagement of the driving clutch as shown in Fig. 1.

Figure 3:
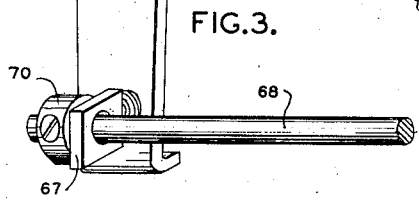
Fig. 3 is an enlarged fragmentary isometric view illustrating the connection of the present invention to the automatic stop pin mechanism.

The present invention comprises a bracket 65 (Fig. 1) fixed to frame 14 and adapted to pivotally support a cam lever 66. Fixed to the lower end of lever 17 (Fig. 3) is a supporting member 67 having a horizontally extending hole therethrough, of such a diameter as to loosely receive a connecting rod 68. As may be seen in Fig. 1, rod 68 is connected at one end to cam lever 66 by a spring 69 and the other end is positioned in the hole of support 67 by an adjustable collar 70. The free fitting of rod 68 in support 67 is essential to permit free movement of the automatic stopping mechanism just described. It is also essential that, with push-button 32 released and lever 17 in its rearmost position, there is no tension upon spring 69. Still further it is essential that spring 69 be strong enough to overcome the tension of spring 84 when push-button 32 is actuated.

With the driving mechanism at rest because of the exhaustion of the card supply in magazine 31 (Fig. 1), pressing and holding button 32 will cause adjustable collar 71 mounted upon shank 33 to be moved rearwardly against the cam surface of lever 66 which will consequently be rocked thus stretching spring 69 consequently applying a resilient forwardly urging force to lever 17 and interponent 16.

As explained above, hook member 36 when carried rearwardly under the influence of push-button 32, will cause engagement of the driving clutch thereby causing cam 15 to rotate. When the high dwell of cam 15 leaves roller 19, interponent 16 will be released from between lug 25 and rod 24 and will be resiliently drawn to the right, i. e., running position, under the influence of spring 69 (Fig. 2). As may readily be seen in this view, because of the superior strength of spring 69 over that of spring 84 the machine will continue to run as long as the push-button 32 is maintained in its actuated position, irrespective of the fact that the supply of cards has been exhausted, thus obviating the necessity of repeated actuations of button 32.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a device of the class described, a record card controlled machine including a driving mechanism, a card supply magazine, a plurality of record cards adapted to be positioned in said magazine, means for feeding said plurality of cards seriatim, means controlled by the last of said plurality of cards to be fed from said magazine to render said driving mechanism ineffective and means adapted to render said last mentioned means ineffective.

2. In a device of the class described, a record card controlled machine including a driving mechanism, a card supply magazine, a plurality of cards adapted to be positioned in said magazine, a push-button adapted to cause the engagement and disengagement of said driving mechanism, means for causing said plurality of cards to be fed seriatim, means controlled by the last of said cards to be fed to cause said driving mechanism to become ineffective, and means controlled by said push-button to render said last mentioned means ineffective.

3. In a machine of the the class described, controlled by record cards passed through the machine, the combination of a supply magazine for the storage of said record cards, means for feeding the cards seriatim from said supply magazine, drive mechanism adapted to control the operation of said feeding means and the passing of the cards through the machine, a spring-pressed pin extending into said supply magazine for sensing the presence or absence of cards therein, means for disabling said drive mechanism, means operable by said sensing pin when said supply magazine is empty for conditioning said disabling means for operation, and means for rendering said sensing pin ineffective.

4. In a machine of the class described, the combination of drive mechanism therefor, a power source for said drive mechanism, a machine clutch connecting said drive mechanism and said power source, means for shifting said clutch to disengaged position whereby said drive mechanism is disconnected from its power source, a reciprocable element operable by said drive mechanism for operating said shifting means, an interponent intermediate said reciprocable element and said shifting means, said interponent being movable relatively thereto to render said element either effective or ineffective to operate said shifting means, a resilient means for moving said interponent to effective position, a second resilient means for moving said interponent to ineffective position, said second resilient means being superior to said first resilient means but normally relaxed, a manually operable push button, and means operable by said push button for tensioning said second resilient means whereby said interponent is held in ineffective position as long as the push button is held operated.

SAMUEL ALVINE.